United States Patent
Suzuki

(10) Patent No.: US 7,084,195 B2
(45) Date of Patent: Aug. 1, 2006

(54) LATEX COMPOSITION AND PROCESS FOR PRODUCING THE SAME, AND ASPHALT COMPOSITION AND CATIONIC ASPHALT EMULSION USING THE SAME

(75) Inventor: Ginpei Suzuki, Mie (JP)

(73) Assignee: JSR Corporation, Tokyo (JP)

( * ) Notice: Subject to any disclaimer, the term of this patent is extended or adjusted under 35 U.S.C. 154(b) by 257 days.

(21) Appl. No.: 10/767,437

(22) Filed: Jan. 30, 2004

(65) Prior Publication Data
US 2005/0038174 A1 Feb. 17, 2005

(30) Foreign Application Priority Data
Aug. 15, 2003 (JP) .............................. 2003-293863

(51) Int. Cl.
*C08L 95/00* (2006.01)
(52) U.S. Cl. .................. 524/60; 524/61; 524/401; 524/505; 524/522; 524/556
(58) Field of Classification Search ................ 524/556, 524/522, 505, 60, 61, 401
See application file for complete search history.

(56) References Cited

U.S. PATENT DOCUMENTS

| | | | | |
|---|---|---|---|---|
| 4,544,690 A | * | 10/1985 | Ladish | ........................ 524/60 |
| 5,045,576 A | | 9/1991 | Roeck et al. | |
| 5,336,712 A | * | 8/1994 | Austgen et al. | ............. 524/530 |
| 6,518,354 B1 | * | 2/2003 | Suzuki et al. | ................ 524/575 |

FOREIGN PATENT DOCUMENTS

| | | |
|---|---|---|
| EP | 1 114 844 | 7/2001 |
| JP | 48-10615 | 4/1973 |
| JP | 48-10939 | 4/1973 |
| JP | 49-98418 | 9/1974 |
| JP | 5-262913 | 10/1993 |
| JP | 3336833 | 10/2002 |

OTHER PUBLICATIONS

Derwent Publications, AN 1981-39407D, XP-002288157, May 10, 1981

* cited by examiner

*Primary Examiner*—Peter D. Mulcahy
(74) *Attorney, Agent, or Firm*—Oblon, Spivak, McClelland, Maier & Neustat, P.C.

(57) ABSTRACT

A latex composition includes (i) 100 parts by mass (in terms of a solid content) of an anionic latex containing, as a main component, a conjugate diene copolymer containing (A) 55 to 99.99% by mass of a conjugate diene unit, (B) 0.01 to 5% by mass of an unsaturated carboxylic acid unit, (C) 0 to 44.99% by mass of an aromatic vinyl compound unit, and (D) 0 to 40% by mass of another unsaturated compound unit copolymerizable therewith, (ii) 0.1 to 20 parts by mass of a nonionic surfactant, and (iii) 0.1 to 10 parts by mass of a cationic surfactant. The latex composition has both of an excellent compatibility with an asphalt and a strong adhesiveness to an aggregate.

22 Claims, No Drawings

LATEX COMPOSITION AND PROCESS FOR PRODUCING THE SAME, AND ASPHALT COMPOSITION AND CATIONIC ASPHALT EMULSION USING THE SAME

BACKGROUND OF THE INVENTION

1. Field of the Invention

The present invention relates to a latex composition suitably usable for the production of water-proofing materials, cement mixing materials, oil extended rubbers, especially road-paving materials and a process for producing the same, and an asphalt composition and a cationic asphalt emulsion using the same.

2. Description of the Related Art

An asphalt has a water-proofing property and an antiseptic property and hence has hitherto been utilized as a road-paving material, a water-proofing material, and the like. For the purpose of improving its adhesiveness, abrasion resistance, impact resistance, low-temperature properties (e.g., low-temperature elongation), and the like, the modification of the asphalt has been effected by adding a latex thereto.

As a latex (an asphalt modifier) for use in such modification of the asphalt, there is known a cationic latex obtained by converting an anionic styrene-butadiene copolymer latex into cationic one (for example, see Japanese Patent Publication Nos. 10615/1973 and 10939/1973) or an anionic latex obtained by dispersing a conjugate dienic copolymer containing an unsaturated carboxylic acid unit in water with an anionic surfactant (for example, see Japanese Patent No. 3336833).

The above cationic latex is excellent in compatibility with an asphalt (usually, being used as a cationized form with a cationic surfactant) or an asphalt emulsion, especially a cationic asphalt emulsion, and the above anionic latex exhibits a strong adhesiveness to an aggregate, so that both of them are suitably used as asphalt modifiers.

However, in recent years, a more efficient high-performance latex (asphalt modifier) having both of the compatibility of the above cationic latex with an asphalt and the strong adhesiveness of the above anionic latex to an aggregate is highly desired.

SUMMARY OF THE INVENTION

The present invention is accomplished for the purpose of solving the above-mentioned problem of the conventional art, and an object thereof is to provide a latex composition having both of an excellent compatibility with an asphalt and a strong adhesiveness to an aggregate and a process for producing the same, and an asphalt composition and a cationic asphalt emulsion using the same.

As a result of intensive studies for solving the above-mentioned problem, the present inventors have found that the above object can be achieved by a latex composition comprising an anionic latex containing, as a main component, a conjugate diene copolymer containing an unsaturated carboxylic acid unit; a nonionic surfactant; and a cationic surfactant in a predetermined ratio. Accordingly, we have completed the invention.

Namely, according to the invention, there is provided a latex composition comprises (i) 100 parts by mass (in terms of a solid content) of an anionic latex containing, as a main component, a conjugate diene copolymer containing (A) 55 to 99.99% by mass of a conjugate diene unit, (B) 0.01 to 5% by mass of an unsaturated carboxylic acid unit, (C) 0 to 44.99% by mass of an aromatic vinyl compound unit, and (D) 0 to 40% by mass of another unsaturated compound unit copolymerizable therewith, (ii) 0.1 to 20 parts by mass of a nonionic surfactant, and (iii) 0.1 to 10 parts by mass of a cationic surfactant.

The latex composition according to the invention is preferably the composition wherein the conjugate diene copolymer is a conjugate diene copolymer having a Mooney viscosity ($ML_{1+4}$, 100° C.) of 70 to 170.

The latex composition according to the invention is preferably the composition which contains at least one selected form the group consisting of a styrene-butadiene copolymer, a styrene-butadiene-styrene block copolymer, and a natural rubber.

The latex composition according to the invention is preferably the composition which further contains 0 to 10 parts by mass of a halide ion source (iv), and more preferably the composition wherein the halide ion source (iv) is at least one selected from the group consisting of sodium chloride, potassium chloride, and hydrochloric acid. Moreover, the latex composition according to the invention is preferably the composition which further contains 0 to 2 parts by mass of a thickener (v).

Moreover, according to the invention, there is provided a process for producing a latex composition comprises (I) a step of adding (ii) 0.1 to 20 parts by mass of a nonionic surfactant to (i) 100 parts by mass (in terms of a solid content) of an anionic latex containing, as a main component, a conjugate diene copolymer containing (A) 55 to 99.99% by mass of a conjugate diene unit, (B) 0.01 to 5% by mass of an unsaturated carboxylic acid unit, (C) 0 to 44.99% by mass of an aromatic vinyl compound unit, and (D) 0 to 40% by mass of another copolymerizable compound unit, and stirring and mixing them to produce a latex composition intermediate, and (II) a step of adding (iii) 0.1 to 10 parts by mass of a cationic surfactant to the latex composition intermediate, and stirring and mixing them to produce the latex composition intermediate.

Furthermore, according to the invention, there is provided an asphalt composition comprising at least an asphalt and a latex composition, which contains 100 parts by mass of the asphalt and 0.5 to 20 parts by mass (in terms of a solid content) of the latex composition and wherein the latex composition is the latex composition mentioned above.

Still further, there is provided a cationic asphalt emulsion comprises, at least, an asphalt, a latex composition, water, and a cationic surfactant, these components forming an emulsion, wherein the latex composition is the latex composition of the invention mentioned above.

[Effect of the Invention]

Since the latex composition of the invention has both of an excellent compatibility with an asphalt and a strong adhesiveness to an aggregate, an asphalt composition having high toughness and tenacity and an asphalt emulsion having a high dynamic stability (flow resistance) can be obtained.

DESCRIPTION OF THE PREFERRED EMBODIMENTS

The following will specifically describe embodiments of the latex composition of the invention and the process for producing the same, and the asphalt composition and the cationic asphalt emulsion using the same, but the invention is not limited to the following embodiments. In this connection, in the specification, the "asphalt composition containing an aggregate" means a composition comprising at least an asphalt and a latex composition and further comprising an aggregate.

(1) Latex Composition

The latex composition of the invention is a latex composition comprising an anionic latex containing, as a main component, a conjugate diene copolymer containing an unsaturated carboxylic acid unit; a nonionic surfactant; and a cationic surfactant in a predetermined ratio.

Such a composition exhibits a strong adhesiveness to an aggregate since the conjugate diene copolymer contains an unsaturated carboxylic acid unit and also is excellent in compatibility with an asphalt since the anionic latex is converted into a cationic one with a nonionic surfactant and a cationic surfactant. Namely, the composition is a high performance composition having both of a strong adhesiveness to an aggregate and an excellent compatibility with an asphalt and an asphalt emulsion, especially a cationic asphalt emulsion and can be suitably used for the production of an asphalt emulsion having an asphalt composition having high toughness and tenacity and an asphalt emulsion having a high dynamic stability (flow resistance).

(i) Anionic Latex

The anionic latex in the invention is an anionic latex containing, as a main component, a conjugate diene copolymer containing (A) a conjugate diene unit and (B) an unsaturated carboxylic acid unit as essential constitutive units.

(A) Conjugate Diene Unit

Examples of the conjugate diene which constitutes the conjugate diene unit in the invention include 1,3-butadiene, isoprene, 2,3-dimethyl-1,3-butadiene, 1,3-pentadiene, 2-methyl-1,3-pentadiene, 1,3-hexadiene, 1,3-heptadiene, 1,3-octadiene, 4,5-diethyl-1,3-octadiene, 3-butyl-1,3-octadiene, chloroprene, and the like.

Of these conjugate dienes, 1,3-butadiene, isoprene, or 1,3-pentadiene is preferable, and 1,3-butadiene is particularly preferable, from the viewpoints of the exhibition of excellent crack resistance and flow resistance at the use as an asphalt modifier as well as industrial easy availability. The conjugate diene unit is constituted by one or two or more of these conjugate dienes.

In the invention, the content of the conjugate diene unit in the conjugate diene copolymer is 55 to 99.9% by mass, preferably 60 to 80% by mass. When the content of the conjugate diene unit is less than the above range, there is possibility that the flexibility of the asphalt composition decreases and the tenacity (caking power), low-temperature elongation, and the like may be impaired, so that the case is not preferable.

On the other hand, when the content exceeds the above range, there is possibility that the mechanical stability of the latex, dispersion/solubility to an asphalt, the toughness of the asphalt composition (gripping power toward an aggregate), the dynamic stability (flow resistance) of the asphalt composition containing an aggregate, and the like decrease, so that the case is not preferable. More specifically, there is a problem that decrease of the mechanical stability of the latex tends to result in the occurrence of agglomerate at the liquid conveyance by pump. Also, there is a problem that decrease of the dynamic stability (flow resistance) of the asphalt composition containing an aggregate tends to cause the occurrence of "grooving" when the composition is used as road-paving material.

The "mechanical stability" in the present specification can be evaluated in accordance with the method described in JIS K6387 using a Mallon-type testing machine. Moreover, the "toughness" and "tenacity" in the present specification can be evaluated in accordance with the method described in "Hoso Shikenho Binnran (handbook of paving test method)" (published by Japan Road Association on Nov. 10, 1988).

(B) Unsaturated Carboxylic Acid Unit

Examples of the unsaturated carboxylic acid which constitutes the unsaturated carboxylic acid unit in the invention include acrylic acid, methacrylic acid, crotonic acid, α-chloroacrylic acid, maleic acid, fumaric acid, itaconic acid, citraconic acid, mesaconic acid, and the like. Of these, acrylic acid, methacrylic acid, or maleic acid is particularly preferable.

The unsaturated carboxylic acid unit may be constituted by an alkali metal salt of the above unsaturated carboxylic acid. Examples of the alkali metal constituting the alkali metal salt include lithium, sodium, potassium, and the like. The unsaturated carboxylic acid unit is constituted by one or two or more of these unsaturated carboxylic acids or alkali salts thereof.

In the invention, the content of the unsaturated carboxylic acid unit in the conjugate diene copolymer is 0.01 to 5% by mass, preferably 0.05 to 2% by mass. When the content of the unsaturated carboxylic acid unit is less than the above range, there is possibility that the mechanical stability of the latex, the dispersion/solubility to the asphalt, the tenacity and toughness of the asphalt composition, the dynamic stability of the asphalt composition containing an aggregate, and the like decrease, so that the case is not preferable.

On the other hand, when the content exceeds the above range, the viscosity of the latex increases and hence the handling becomes difficult as well as the dispersion/solubility to the asphalt, the tenacity and toughness of the asphalt composition, the dynamic stability of the asphalt composition containing an aggregate, and the like may decrease, so that the case is not preferable.

The conjugate diene copolymer in the invention comprises (A) the conjugate diene unit and (B) the unsaturated carboxylic acid unit as essential constitutive units but may also contain (C) the aromatic vinyl compound unit and (D) other unsaturated monomer unit.

(C) Aromatic Vinyl Compound Unit

Examples of the aromatic vinyl compound which constitutes the aromatic vinyl compound unit include styrene, α-methylstyrene, vinyltoluene, vinylxylene, ethylstyrene, p-t-butylstyrene, monochlorostyrene, dichlorostyrene, monobromostyrene, dibromostyrene, 1,1-diphenylstyrene, N,N-dimethyl-p-aminostyrene, N,N-diethyl-p-aminostyrene, N,N-dimethyl-p-aminoethylstyrene, N,N-diethyl-p-aminoethylstyrene, divinylbenzene, vinylnaphthalene, vinylpyridine, and the like.

Of these aromatic vinyl compounds, styrene or α-methylstyrene is particularly preferable. The aromatic vinyl compound unit is constituted by one or two or more of these aromatic vinyl compounds.

In the invention, the content of the aromatic vinyl compound unit is 0 to 44.99% by mass, preferably 15 to 40% by mass. When the content of the aromatic vinyl compound unit is less than above range, there is possibility that the compatibility with the asphalt deteriorates, so that the case is not preferable.

On the other hand, when the content exceeds the above range, there is possibility that the flexibility of the asphalt composition decreases and the tenacity (caking power) and low-temperature elongation are impaired, so that the case is not preferable.

(D) Other Unsaturated Monomer Unit

The unsaturated monomer which constitutes "Other unsaturated monomer unit" in the invention is not particularly limited as far as it is an unsaturated monomer capable of copolymerization with the above conjugate diene, unsaturated carboxylic acid, or aromatic vinyl compound.

Examples thereof include i) (meth)acrylate esters such as methyl (meth)acrylate, ethyl (meth)acrylate, n-butyl (meth) acrylate, t-butyl (meth)acrylate, n-hexyl (meth)acrylate, 2-ethylhexyl (meth)acrylate, 2-hydroxyethyl (meth)acrylate, 2-hydroxypropyl (meth)acrylate, 3-hydroxypropyl (meth) acrylate, N,N-dimethylaminoethyl (meth)acrylate, N,N-diethylaminoethyl (meth)acrylate, and glycidyl (meth)acrylate, ii) unsaturated amides or imides such as (meth) acrylamide, N-methylol(meth)acrylamide, and maleimide, iii) cyanide vinyl compounds such as (meth)acrylonitrile and vinylidene cyanide, and the like.

"Other unsaturated monomer unit" is constituted by one or two or more of the above unsaturated monomers. In the invention, the content of "Other unsaturated monomer unit" in the conjugate diene copolymer is 0 to 40% by mass, preferably 1 to 10% by mass. When the content of "Other unsaturated monomer unit" is less than the above range, there is possibility that the mechanical stability of the latex deteriorates, so that the case is not preferable. When the content exceeds the above range, there is possibility that the compatibility with the asphalt deteriorates, so that the case is not preferable.

The conjugate diene copolymer in the invention is preferably a conjugate diene copolymer having a Mooney viscosity ($ML_{1+4}$, 100° C.) of 70 to 170, more preferably a conjugate diene copolymer having a viscosity of 80 to 150. When the Mooney viscosity is less than the above range, there is possibility that the compatibility with the asphalt deteriorates, so that the case is not preferable. On the other hand, the viscosity exceeds the above range, there is possibility that the adhesiveness to an aggregate decreases, so that the case is not preferable.

The Mooney viscosity of the conjugate diene copolymer can be easily controlled to an aimed value by properly combining the conditions such as the kind and amount of a chain transfer agent and the amount of a polymerization initiator at the emulsion polymerization. In this connection, "Mooney viscosity" in the specification means a value measured in accordance with the method described in JIS K6387 after the conjugate diene copolymer is recovered from the latex.

(i) Nonionic Surfactant

A nonionic surfactant is a surfactant wherein the hydrophilic group is not ionic. In the invention, at the conversion of an anionic latex into cationic one, the surfactant is added prior to the addition of the cationic surfactant in order to prevent agglomeration of the rubber components (conjugate diene copolymer and the like) in the latex.

As the nonionic surfactant in the invention, polyoxyethylene alkyl ether and the like may be mentioned, for example. In the invention, when the content of the anionic surfactant in the latex composition is 100 parts by mass, the nonionic surfactant is contained in an amount of 0.1 to 20 parts by mass, preferably 1 to 15 parts by mass. When the content of the nonionic surfactant is less than the above range, there is possibility that the compatibility to the asphalt deteriorates, so that the case is not preferable. When the content exceeds the above range, there is possibility that the adhesiveness to an aggregate decreases, so that the case is not preferable.

(iii) Cationic Surfactant

A cationic surfactant is a surfactant wherein the hydrophilic group shows cationic property. In the invention, it is added for the purpose of converting an anionic latex into cationic one.

As the cationic surfactant in the invention, polyoxyethylenealkylpropylenediamine may be mentioned, for example. In the invention, when the content of the anionic surfactant (in terms of a solid content) in the latex composition is 100 parts by mass, the cationic surfactant is contained in an amount of 0.1 to 10 parts by mass, preferably 0.5 to 7.0 parts by mass. When the content of the cationic surfactant is less than the above range, there is possibility that the compatibility to the asphalt deteriorates, so that the case is not preferable. When the content exceeds the above range, there is possibility that the adhesiveness to an aggregate decreases, so that the case is not preferable.

The latex composition of the invention is the composition comprising an anionic latex (i), a nonionic surfactant (ii), and a cationic surfactant (iii) as essential components, but may be the composition which also contains a halide ion source (iv) and a thickener (v), for example.

(iv) Halide Ion Source

The halide ion source in the invention means a substance which ionically dissociates in water to form a halide ion. In the invention, the source is added in order to prevent agglomeration of rubber components (conjugate diene copolymer and the like) in the latex. Since the mechanical stability of the latex composition is improved by adding the halide ion source, the problem of clogging a nozzle can be effectively prevented at spraying of the latex composition of the invention from the nozzle.

The halide ion source in the invention is not particularly limited unless it impairs the effect of the invention. For example, there is mentioned at least one selected from the group consisting of alkali metal halides such as sodium chloride, potassium chloride, magnesium chloride, and potassium bromide, and hydrochloric acid. Of these halide ion sources, sodium chloride and potassium chloride are particularly preferable from the viewpoints of high safety and a large effect on the improvement of the mechanical stability of the latex composition.

In the invention, when the content of the anionic surfactant (in terms of a solid content) in the latex composition is 100 parts by mass, the halide ion source is preferably contained in an amount of 0 to 10 parts by mass, more preferably 0.1 to 5 parts by mass. When the content of the halide ion source is less than the above range, there is possibility that the compatibility to the asphalt deteriorates, so that the case is not preferable. When the content exceeds the above range, there is possibility that the mechanical stability of the latex composition decreases, so that the case is not preferable.

(v) Thickener

The thickener in the invention means a substance which increases the viscosity of the latex composition and controls the flowability. In the invention, it is added in order to prevent the generation of concentration distribution between upper and lower layers during the standing storage of the latex. Since the addition of the thickener improves the mechanical stability of the latex composition, for example, the trouble of generating concentration distribution between upper and lower layers during the standing storage of the latex owing to the difference in particle size and specific gravity of the constitutive components can be effectively prevented at the time when the latex composition of the invention is mixed with other components.

As the thickener in the invention, a polymer polysaccharide, e.g., xanthan gum, may be mentioned. In the invention, when the content of the anionic surfactant (in terms of a solid content) in the latex composition is 100 parts by mass, the thickener is preferably contained in an amount of 0 to 2 parts by mass, more preferably 0.1 to 1.5 parts by mass. When the content of the thickener is less than the above range, there is possibility of generating concentration distribution between upper and lower layers during the standing storage of the latex, so that the case is not preferable. When the content exceeds the above range, there is possibility that the viscosity of the latex becomes unnecessarily high and thus the latex lacks practicability, so that the case is not preferable.

It is sufficient that the latex composition of the invention contains the above conjugate diene copolymer as a main component (30% by mass in terms of a solid content) and the composition may contain, in addition to the main component of the above conjugate diene copolymer, at least one selected from the group consisting of a styrene-butadiene copolymer (containing no unsaturated carboxylic acid unit), a styrene-butadiene-styrene block copolymer, and a natural rubber.

The latex composition of the invention may further contain, as required, a dispersant, a stabilizer, an antiaging agent, a UV absorber, an antistripping agent, an antiseptic, and a deforming agent, and also a protective colloid such as poly(sodium acrylate), polyvinyl alcohol, casein, gelatin, carboxymethyl cellulose, or hydroxyethyl cellulose.

The latex composition of the invention usually has a viscosity of about 0.01 to 1 Pa·s, and the composition having a viscosity of 0.02 to 0.5 Pa·s is preferable. Moreover, the solid content is usually about 40 to 70% by mass, and the composition having a solid content of 45 to 60% by mass is preferable.

In addition, the average particle size of the rubber component (conjugate diene copolymer and the like) in the latex composition of the invention is usually about 60 to 300 nm, and the composition having an average particle size of 80 to 200 nm is preferable. When the average particle size is less than the above range, the viscosity of the latex increases and thus the handling becomes difficult as well as there is possibility that the dispersibility and solubility to the asphalt decrease, so that the case is not preferable. On the other hand, when the size exceeds the above range, there is also possibility that the dispersibility and solubility to the asphalt decrease, so that the case is not preferable.

The average particle size of the rubber component in the latex composition can be easily controlled to an aimed value by suitably combining the conditions such as the amounts of water, an emulsifying agent or a polymerization initiator, or polymerization temperature at the emulsion polymerization.

In this connection, the "average particle size" in the specification means the value obtained by measurement using a laser particle size analyzing system (Trade name: LPA-3100, manufactured by Otsuka Electronics Co., Ltd.).

The gel content of the latex composition of the invention is usually about 0.1 to 80% by mass, preferably 0.1 to 50% by mass, more preferably 0.1 to 30% by mass. When the gel content is less than the above range, there is possibility that the tenacity and toughness of the asphalt composition decrease, so that the case is not preferable. When the content exceeds the above range, there is possibility that the dispersibility and solubility to the asphalt decrease, so that the case is not preferable.

The gel content of the latex composition can be easily controlled to an aimed value by suitably selecting the kind and amount of a chain transfer agent acting as a molecular weight-controlling agent at the emulsion polymerization or the amount of an polymerization initiator or polymerization temperature at the emulsion polymerization.

In this connection, the "gel content" in the specification means a value obtained by immersing a dry film (weight: a mg) formed from the latex under stirring in 100 mL of toluene at 50° C. for 2 hours, filtering it through a 120 mesh woven metal wire, exactly taking out a portion (c mL) of the filtrate, evaporating it into dryness, weighing the resultant remaining solid content (b mg, toluene insoluble content), and performing calculation according to the following equation (1).

$$\text{Gel content (\%)} = \{[a-(b \times 100/c)]/a\} \times 100 \tag{1}$$

The pH of the latex composition of the invention is usually about 3 to 11, preferably 4 to 10. When the pH is less than the above range, there is possibility that the mechanical stability of the latex composition deteriorates, so that the case is not preferable. When the pH exceeds the above range, there is possibility that the compatibility with the asphalt deteriorates, so that the case is not preferable.

The pH of the latex composition can be easily controlled to an aimed value by suitably selecting the kind and amount of a cationic surfactant or the kind and amount of a nonionic surfactant.

(2) Process for Producing Latex Composition

The process for producing the latex composition of the invention comprises (I) a step of adding a nonionic surfactant to an anionic latex containing, as a main component, a conjugate diene copolymer containing an unsaturated carboxylic acid unit, and stirring and mixing them to produce a latex composition intermediate, and (II) a step of adding a cationic surfactant to the latex composition intermediate, and stirring and mixing them to produce the latex composition intermediate.

According to such a process, a high performance latex composition having both of a strong adhesiveness to an aggregate and an excellent compatibility with an asphalt can be conveniently obtained without associating the aggregation of rubber components (conjugate diene copolymer and the like) in the latex.

(I) Production Step of Latex Composition Intermediate

First, there is prepared (i) an anionic latex containing, as a main component, a conjugate diene copolymer containing (A) 55 to 99.99% by mass of a conjugate diene unit, (B) 0.01 to 5% by mass of an unsaturated carboxylic acid unit, (C) 0 to 44.99% by mass of an aromatic vinyl compound unit, and (D) 0 to 40% by mass of another copolymerizable compound unit.

Such an anion latex can be produced, for example, by copolymerizing predetermined amounts of a conjugate diene and an unsaturated carboxylic acid, optionally an aromatic vinyl compound or other unsaturated monomer according to the hitherto known emulsion polymerization method, and controlling the pH to 6 or higher by neutralizing the carboxyl group in the conjugated diene copolymer during and/or after the polymerization.

At that time, when the pH is lower than 6, the unsaturated carboxylic acid in the resulting conjugate diene copolymer cannot be converted into an alkali metal salt and the content of the alkali metal salt of the unsaturated carboxylic acid decreases, so that the case is not preferable because of possible decrease of the mechanical stability of the latex, the dispersibility and solubility to the asphalt, the toughness and tenacity of the asphalt composition, the dynamic stability of the asphalt composition containing an aggregate, and the like.

Alternatively, the above anionic latex can be produced by copolymerizing predetermined amounts of a conjugate diene and an alkali salt of an unsaturated carboxylic acid, optionally an aromatic vinyl compound or other unsaturated monomer according to the hitherto known emulsion polymerization method.

The surfactant (emulsifier), polymerization initiator, chain transfer agent (molecular weight-controlling agent), and the like are not particularly limited. Examples of the surfactant include anionic surfactants such as oleic acid sulfate sodium salt, sodium dodecylbenzenesulfonate, sodium laurylsulfate, sodium diphenyl ether sulfonate, and dialkyl succinate sodium sulfonate; fluorinated surfactants; and the like.

Of these, oleic acid sulfate sodium salt is suitably used from the viewpoint of an especially excellent effect that the mechanical stability of the latex is improved. In the process of the invention, one or two or more kinds of these surfactants can be used.

When the total mass of all the monomer components is 100 parts by mass, the amount of the emulsifier to be used is generally 0.5 to 10 parts by mass, preferably 1 to 8 parts by mass relative to the 100 parts by mass. When the amount of the emulsifier to be used is less than the above range, there is possibility that the polymerization stability of the latex decreases owing to the formation of agglomerate and the like and thus the production of the anionic latex is disturbed, so that the case is not preferable. On the other hand, when the amount exceeds the above range, the case is not preferable because of possible decrease of the toughness and tenacity of the asphalt composition.

Examples of the polymerization initiator include i) inorganic polymerization initiators such as potassium persulfate, sodium persulfate, and ammonium persulfate, ii) organic polymerization initiators such as hydroperoxides including benzene hydroperoxide, p-menthane hydroperoxide, cumene hydroperoxide, and t-butyl hydroperoxide and azo compounds including azobisisobutyronitrile and azobisisovaleronitrile. In the process of the invention, one or two or more kinds of these polymerization initiators can be used.

When the total mass of all the monomer components is 100 parts by mass, the amount of the polymerization initiator to be used is generally 0.03 to 2 parts by mass, preferably 0.05 to 1 part by mass relative to the 100 parts by mass. When the amount of the polymerization initiator to be used is less than the above range, there is possibility that the polymerization does not proceed, so that the case is not preferable. When the amount exceeds the above range, there is possibility that the control of particle size and Mooney viscosity of the latex becomes difficult, so that the case is not preferable.

Moreover, in order to accelerate the emulsion polymerization, a reducing agent such as sodium pyrobisulfite, sodium sulfite, sodium hydrogen bisulfite, ferrous sulfate, glucose, formaldehyde sodium sulfoxylate, L-ascorbic acid or a salt thereof or a chelating agent such as glycine, alanine, or sodium ethylenediaminetetraacetate can be used in combination with the above polymerization initiator.

Examples of the chain transfer agent include α-styrene dimers (preferably, those containing 60% by mass of 2,4-diphenyl-4-methyl-1-pentene component), terpinolene, α-terpinene, γ-terpinene, dipentene, n-octyl mercaptane, n-dodecyl mercaptan, t-dodecyl mercaptan, n-hexadecyl mercaptan, dimethylxangen disulfide, diethylxangen disulfide, diisopropylxangen disulfide, tetramethylthiuram disulfide, tetraethylthiuram disulfide, tetrabutylthiuram disulfide, dipentamethylenethiuram disulfide, and the like.

In the process of the invention, one or two or more of these chain transfer agents can be used. When the total weight of all the monomer components is 100 parts by mass, the amount of the chain transfer agent to be used is generally 0.01 to 5 parts by mass, preferably 0.03 to 1 part by mass relative to the 100 parts by mass. When the amount of the chain transfer agent to be used is less than the above range, there is possibility that the Mooney viscosity of the conjugate diene copolymer becomes 70 or lower and thus the adhesiveness to an aggregate decreases, so that the case is not preferable. When the amount exceeds the above range, there is possibility that the Mooney viscosity of the conjugate diene copolymer becomes 170 or higher and thus the compatibility with the asphalt deteriorates, so that the case is not preferable.

At the emulsion polymerization, in addition to the above surfactant (emulsifier), polymerization initiator, and chain transfer agent, various electrolytes and pH controllers may be used in combination, as required. As the amount of a dispersing medium, it is general to use water in an amount of 100 to 300 parts by mass when the total mass of all the monomer components is 100 parts by mass. The polymerization temperature is generally 10 to 80° C., preferably 30 to 60° C. The polymerization time is usually 15 to 40 hours.

The addition method of each monomer at the emulsion polymerization may be any of a lump-sum addition mode, a fractional addition mode, and a continuous addition mode. Alternatively, part or all of the monomer components may be emulsified beforehand and then added, or these modes may be suitably combined.

In the process of the invention, a latex composition intermediate can be produced by adding (ii) a nonionic surfactant to the thus prepared anionic latex and stirring and mixing them. At that time, the amount of the nonionic surfactant to be added is controlled so that the nonionic surfactant is 0.1 to 20 parts by mass relative to 100 parts by mass (in terms of a solid content) of the anionic latex.

In this connection, it is preferable to add the already described halide ion source and/or thickener prior to the addition of the nonionic surfactant. One or two or more of the already described dispersant, stabilizer, antiaging agent, UV absorber, antistripping agent, antiseptic, deforming agent, and protective colloid may be previously added.

Moreover, prior to the addition of the nonionic surfactant, other rubber component, for example, at least one selected from the group consisting of a styrene-butadiene copolymer, a styrene-butadiene-styrene block copolymer, and a natural rubber may be added.

(II) Production Step of Latex Composition

The latex composition of the invention can be produced by adding (iii) a cationic surfactant to the latex composition intermediate obtained in the production step of the above latex composition intermediate and stirring and mixing them, whereby the anionic latex is converted into cationic one. At that time, the amount of the cationic surfactant to be added is controlled so that the cationic surfactant is 0.1 to 10 parts by mass relative to 100 parts by mass (in terms of a solid content) of the anionic latex.

Moreover, after the addition of the cationic surfactant, at least one selected from the group consisting of a styrene-butadiene copolymer latex (containing no unsaturated carboxylic acid unit), a styrene-butadiene-styrene block copolymer emulsion, and a natural rubber latex may be added.

(3) Asphalt Composition

The asphalt composition of the invention comprises at least an asphalt and a latex composition, which contains 100 parts by mass of the asphalt and 0.5 to 20 parts by mass (in terms of a solid content) of the latex composition and wherein the latex composition is the latex composition of the invention mentioned above.

Since such an asphalt composition contains the latex composition having both of a strong adhesiveness to an aggregate and an excellent compatibility with the asphalt, the composition has high tenacity and toughness and is excellent in dynamic stability (flow resistance) when an asphalt composition containing an aggregate is formed. Accordingly, the composition can be used as an asphalt modifier for road-paving material capable of effectively preventing cracking and grooving.

The asphalt to be used in the asphalt composition of the invention is not particularly limited and may be a natural asphalt, a petroleum asphalt, a regenerated asphalt, or a mixture thereof.

Examples of the above natural asphalt include gilsonite, glance pitch, grahamite, Trinidad lake asphalt, and the like. In the invention, one or two or more of these natural asphalts can be suitably used.

Examples of the above petroleum asphalt include various penetration number-grade straight asphalts obtained by distillation of crude oil, blown asphalts or semi-blown asphalts produced by blowing air into these straight asphalts in the presence or absence of a catalyst, solvent-depitched asphalts obtained by separation with a solvent such as propane or butane from a petroleum fraction containing an asphalt, and the like. In the invention, one or two or more of these petroleum asphalts can be suitably used.

The above regenerated asphalt is obtained by extracting an asphalt component from used asphalt-based road-paving materials and the like with a solvent such as propane or butane. At the use of such regenerated asphalt, it is preferable to use an oil extended rubber obtained by adding an additive for regeneration, e.g., an aromatic oil, a naphthene-based oil, or a paraffin-based oil to the latex composition of the invention.

Of these asphalts, a straight asphalt, particularly a straight asphalt having a penetration degree at 25° C. ranging from 40 to 150, more preferably from 60 to 120 is preferable.

The content of the latex composition in the asphalt composition varies depending on the intended use. For example, in the case of using it as a road-paving material, the latex composition is contained in an amount of 0.5 to 20 parts by mass (in terms of a solid content), preferably 1 to 10 parts by mass relative to 100 parts by mass of the asphalt in the asphalt composition. When the content of the latex composition is less than the above range, there is possibility that the modification effect on the asphalt is not exhibited, so that the case is not preferable. When the content exceeds the above range, the case is not preferable because of possible deterioration of the compatibility with the asphalt.

The process for producing the asphalt composition of the invention is not particularly limited. For example, there may be mentioned a method of adding the latex composition of the invention to an asphalt so as to be a predetermined ratio and then stirring and kneading the mixture homogeneously. As equipment for the stirring and kneading, an appropriate plant, e.g., a hot asphalt composition-producing plant for road-paving can be employed. The stirring and kneading can be carried out at room temperature, a relatively low temperature of 80 to 120° C., or a high temperature exceeding 120° C., but it is preferable to carry out the stirring and kneading at a high temperature exceeding 120° C. since it is possible to mix them homogeneously within a short period of time.

(4) Cationic Asphalt Emulsion

The cationic asphalt emulsion of the invention comprises at least an asphalt, a latex composition, water, and a cationic surfactant, these components forming an emulsion, wherein the latex composition is the latex composition of the invention mentioned above.

Since such a cationic asphalt emulsion contains the latex composition having both of a strong adhesiveness to an aggregate and an excellent compatibility with the asphalt, the composition has high tenacity and toughness and is excellent in dynamic stability (flow resistance) when an asphalt composition containing an aggregate is formed. Accordingly, the cationic asphalt composition singly can be suitably used as a road-paving material for tack coat for the purpose of improving adhesiveness between a base layer and a new paved layer (surface layer) and preventing surface-layer sliding. Also, the emulsion can be suitably used as a road-paving material for microsurfacing where the cationic asphalt emulsion is mixed with an aggregate (crushed stone having a particle size of about 2 to 5 mm) and a load surface is lightly paved with the resulting slurry mixture.

The cationic asphalt emulsion of the invention may be incorporated with an acid or other additive in addition to the asphalt, the latex composition, water, and the cationic surfactant.

The process for producing the cationic asphalt emulsion of the invention is not particularly limited and there may be mentioned, for example, a method of adding at least the latex composition of the invention and optionally an acid and other additive to a commercially available asphalt emulsion (one containing an asphalt, water, and a cationic surfactant, these components forming an emulsion; e.g., PK-4 defined in JIS K2208), and stirring and mixing them homogeneously; a method of adding the latex composition of the invention and optionally an acid and other additive to a cationic surfactant for emulsifying an asphalt, and stirring and mixing them together with a hot asphalt homogeneously; and a method of previously solving and dispersing the latex composition of the invention in a hot asphalt to form a reformed asphalt, and adding a cationic surfactant and optionally an acid and other additive to the reformed asphalt, and stirring and mixing them homogeneously.

EXAMPLES

The following will specifically describe the invention with reference to Examples, but the invention is by no means limited to these Examples. As the average particle size, gel content, Mooney viscosity, mechanical strength, toughness, and tenacity to be described in the following Examples and Comparative Examples, values obtained from the measurements according to the methods already described were employed.

[Production of Anionic Latex]

Synthesis Example 1

Into a 100 L autoclave were charged 65 parts by mass of butadiene, 1 part by mass of acrylic acid, 34 parts by mass of styrene, 0.5 part by mass of potassium persulfate as a polymerization initiator, 0.15 part by mass of t-dodecyl mercaptan as a chain transfer agent (molecular weight controller), and 5 parts by mass of oleic acid sulfate ester sodium salt as an emulsifier, and 120 parts by mass of water, followed by emulsion polymerization at a polymerization temperature of 45 to 70° C. under stirring at a rotation number of 170 rpm using a paddle blade.

In the state of polymerization conversion of 65%, 0.5 part by mass of N,N-diethylhydroxylamine was added as a reaction terminator. Finally, after the pH was controlled by adding 1.5 parts by mass of potassium hydroxide, the monomers were removed and the reaction mixture was concentrated to obtain an anionic latex of Synthesis Example 1.

Synthesis Examples 2 to 5 and Comparative Synthesis Examples 1 to 2

Each anionic latex of Synthesis Examples 2 to 5 and Comparative Synthesis Examples 1 to 2 was obtained in a similar manner to Synthesis Example 1 with the exception that the charging ratio of the starting materials was changed to the values described in Table 1.

[Production of Latex Composition]

Example 1

A latex composition intermediate was produced by adding 2 parts by mass of potassium chloride as a halide ion source and 0.5 part by mass of xanthan gum to 100 parts by mass of an anionic latex of Synthesis Example 1, and stirring and mixing them, followed by adding 10 parts by mass of polyoxyethylene alkyl ether as a nonionic surfactant and stirring and mixing the mixture.

A latex composition of Example 1 was produced by adding 2 parts by mass of polyoxyethylenealkylpropylenediamine as a cationic surfactant to the latex composition intermediate, and stirring and mixing them. Table 1 shows evaluation results of the properties and performance of the latex composition.

Examples 2 to 5 and Comparative Examples 1 to 2

Each latex composition of Examples 2 to 5 and Comparative Examples 1 to 2 was obtained in a similar manner to Example 1 with the exception that each anionic latex of Synthesis Examples 2 to 5 and Comparative Synthesis Examples 1 to 2 was used and the charging ratio of the

TABLE 1

| | Anionic latex Conjugate diene copolymer | | | Nonionic surfactant (part by mass) | Cationic surfactant (part by mass) | Halide ion source | | Thickener (part by mass) |
|---|---|---|---|---|---|---|---|---|
| | Conjugate diene (% by mass) | Unsaturated carboxylic acid (% by mass) | Aromatic vinyl compound (% by mass) | | | | (part by mass) | |
| Synthesis Example 1 | 65 | 1 | 34 | 10 | 2 | KCl | 2 | 0.5 |
| Synthesis Example 2 | 65 | 0.5 | 34.5 | 10 | 2 | NaCl | 2 | 0.5 |
| Synthesis Example 3 | 69.5 | 0.5 | 30 | 10 | 1 | KCl | 2 | 0.5 |
| Synthesis Example 4 | 69.5 | 0.05 | 30.45 | 12 | 1 | HCl | 1.5 | — |
| Synthesis Example 5 | 69 | 1 | 30 | 10 | 2 | KCl | 2 | — |
| Comparative Synthesis Example 1 | 70 | — | 30 | 10 | 2 | HCl | 1.5 | — |
| Comparative Synthesis Example 2 | 39 | 1 | 60 | 10 | 2 | — | — | — | starting materials and kind of the halide ion source were changed to the values and kind described in Table 1. Table 2 shows evaluation results of the properties and performance of these latex compositions.

TABLE 2

| | Properties of latex composition | | | | | Performance of latex composition |
|---|---|---|---|---|---|---|
| | PH | Mooney viscosity ($ML_{1+4}$, 100° C.) | Gel content | Mechanical stability (agglomerate amount) (%) | Storage stability (agglomerate amount) (%) | Compatibility with asphalt emulsion |
| Example 1 | 9.8 | 120 | 1.0 | 0.001 | 0 | o(No agglomeration) |
| Example 2 | 10.0 | 110 | 0.5 | 0.002 | 0 | o(No agglomeration) |
| Example 3 | 10.0 | 130 | 0.5 | 0.002 | 0 | o(No agglomeration) |
| Example 4 | 4.0 | 120 | 0.1 | 0.003 | 0 | o(No agglomeration) |
| Example 5 | 9.8 | 55 | 1.0 | 0.005 | 0 | o(No agglomeration) |

TABLE 2-continued

|  | | Properties of latex composition | | | | Performance of latex composition Compatibility with asphalt emulsion |
|---|---|---|---|---|---|---|
|  | PH | Mooney viscosity ($ML_{1+4}$, 100° C.) | Gel content | Mechanical stability (agglomerate amount) (%) | Storage stability (agglomerate amount) (%) | |
| Comparative Example 1 | 4.2 | 50 | 0.0 | 14.825 | 1.895 | ο (No agglomeration) |
| Comparative Example 2 | 10.0 | 80 | 2.0 | 0.006 | 0 | x (Agglomerated) |

*Storage stability is shown by agglomerate amount generated after the passage of 3 months at room temperature.

Moreover, with regard to the latex compositions of Examples 1 to 5 and Comparative Examples 1 to 2, the performance as an asphalt emulsion (road-paving material for tack coat) or an asphalt composition containing an aggregate (road-paving material for microsurfacing) was evaluated.

[Production of Asphalt Emulsion]

Examples 6 to 10 and Comparative Examples 3 to 4

Each asphalt emulsion of Examples 6 to 10 and Comparative Examples 3 to 4 was obtained by adding 4 parts by mass of any of the latex compositions of Examples 1 to 5 and Comparative Examples 1 to 2 to 100 parts by mass of a commercially available asphalt emulsion PK-4 as defined in JIS K2208 and stirring the mixture with a stirrer equipped with a four-fin stirring blade. A test sample was manufactured by kneading the asphalt emulsion at 90° C. under a condition of rotation number of 400 to 500 rpm to evaporate most of the moisture in the asphalt emulsion and then evaporating the moisture in the asphalt emulsion completely by elevating the temperature to 160° C. The performance of each test sample was evaluated in accordance with the method described in "Hoso Shikenho Binnran (handbook of paving test method)" (published by Japan Road Association on Nov. 10, 1988). Table 3 shows the results.

asphalt compositions of Examples 6 to 10 and Comparative Examples 3 to 4 to 100 parts by mass of an aggregate, and stirring and mixing them. These asphalt compositions containing an aggregate were poured into a circular mold having a thickness of 6 mm to prepare test samples. The performance of these test samples was evaluated as asphalt compositions containing an aggregate. Table 3 shows the results.

[Evaluation]

The latex compositions of Examples 1 to 5 were satisfactory in mechanical stability as latexes and compatibility with an asphalt emulsion (see, Table 2), and were excellent in performance (toughness, and tenacity, softening point) when they were converted into asphalt emulsions, and performance (abrasion amount in the wet track abrasion test) when they were converted into asphalt compositions containing an aggregate (see, Table 3). In particular, the latex compositions of Examples 1 to 4 wherein the Mooney viscosity of the conjugate diene copolymer fell within the range of 70 to 170 exhibited an extremely satisfactory performance when they were converted into cationic asphalt emulsions (Examples 6 to 9).

On the other hand, the latex composition of Comparative Example 1 was inferior in mechanical stability and storage stability of a latex since the composition contains no unsaturated carboxylic acid unit (acrylic acid unit) in the conjugate diene copolymer (see, Table 2). Moreover, since the Mooney viscosity did not fall within the range of 70 to 170,

TABLE 3

|  | Performance of asphalt emulsion | | | | | | Performance of asphalt composition containing an aggregate Wet track abrasion test (abrasion amount) (g/m²) |
|---|---|---|---|---|---|---|---|
|  | 60-mesh residue (%) | Penetration number (1/10 mm) | Softening point (° C.) | Toughness (25° C.) (N · m) | Tenacity (25° C.) (N · m) | Low-temperature elongation (elongation at 7° C.) (N · m) | |
| Example 6 | 0.007 | 70 | 63.0 | 20.3 | 16.9 | over 100 | 230 |
| Example 7 | 0.009 | 68 | 62.5 | 18.8 | 14.3 | over 100 | 260 |
| Example 8 | 0.006 | 71 | 62.0 | 18.5 | 14 | over 100 | 250 |
| Example 9 | 0.011 | 69 | 63.0 | 19.8 | 16.4 | over 100 | 240 |
| Example 10 | 0.015 | 74 | 52.5 | 5.9 | 3.2 | over 100 | 610 |
| Comparative Example 3 | 0.012 | 73 | 52.0 | 7.8 | 4.1 | over 100 | 720 |
| Comparative Example 4 | Impossible to filter | 74 | 51.5 | 3.5 | 1.7 | 15 | 2500 |

[Production of Asphalt Composition Containing an Aggregate]

Each of 7 kinds of the asphalt compositions containing an aggregate was obtained by adding 0.3 part by mass of cement, 12 parts by mass of water, 0.8 part by mass of an antistripping agent, and 15 parts by mass of any of the the composition was inferior in performance (toughness, and tenacity, softening point) when it was converted into asphalt emulsions (Comparative Example 3), and performance (abrasion amount in the wet track abrasion test) when it was converted into asphalt compositions containing an aggregate (see, Table 3).

Also, the latex composition of Comparative Example 2 had a content of butadiene, a conjugate diene unit in the conjugate diene copolymer of less than 55% by mass, and the composition was inferior in performance (toughness, and tenacity, softening point, elongation at 7° C.) when it was converted into asphalt emulsions (Comparative Example 4), and performance (abrasion amount in the wet track abrasion test) when it was converted into asphalt compositions containing an aggregate (see, Table 3).

INDUSTRIAL APPLICABILITY

The latex composition of the invention can be suitably used for the production of water-proofing materials, cement mixing materials, oil extended rubbers, especially road-paving materials for tack coat and for microsurfacing.

What is claimed is:

1. A latex composition comprising:
    (i) 100 parts by mass (in terms of a solid content) of an anionic latex comprising a conjugate diene copolymer comprising (A) 55 to 99.99% by mass of a conjugate diene unit, (B) 0.01 to 5% by mass of an unsaturated carboxylic acid unit, (C) 0 to 44.99% by mass of an aromatic vinyl compound unit, and (D) 0 to 40% by mass of another unsaturated compound unit copolymerizable therewith,
    (ii) 0.1 to 20 parts by mass of a nonionic surfactant,
    (iii) 0.1 to 10 parts by mass of a cationic surfactant, and
    (iv) 0.1 to 10 parts by mass of a halide ion source.

2. The latex composition according to claim 1, wherein the conjugate diene copolymer is a conjugate diene copolymer having a Mooney viscosity ($ML_{1+4}$, 100° C.) of 70 to 170.

3. The latex composition according to claim 1, further comprising: at least one selected form the group consisting of a styrene-butadiene copolymer, a styrene-butadiene-styrene block copolymer, and a natural rubber.

4. The latex composition according to claim 1, comprising: 0.1 to 5 parts by mass of a halide ion source (iv).

5. The latex composition according to claim 1, wherein the halide ion source (iv) is at least one selected from the group consisting of sodium chloride, potassium chloride, and hydrochloric acid.

6. The latex composition according to claim 1, which further comprises 0.1 to 2 parts by mass of a thickener (v).

7. A process for producing a latex composition comprising:
    (I) adding (iv) 0.1 to 10 parts by mass of a halide ion source and (ii) 0.1 to 20 parts by mass of a nonionic surfactant to (i) 100 parts by mass of an anionic latex comprising a conjugate diene copolymer comprising (A) 55 to 99.99% by mass of a conjugate diene unit, (B) 0.01 to 5% by mass of an unsaturated carboxylic acid unit, (C) 0 to 44.99% by mass of an aromatic vinyl compound unit, and (D) 0 to 40% by mass of another copolymerizable compound unit, and stirring and mixing them to produce a latex composition intermediate, and
    (II) adding (iii) 0.1 to 10 parts by mass of a cationic surfactant to the latex composition intermediate, and stirring and mixing them to produce the latex composition.

8. The process for producing a latex composition according to claim 7, wherein the conjugate diene copolymer is a conjugate diene copolymer having a Mooney viscosity ($ML_{1+4}$, 100° C.) of 70 to 170.

9. The process for producing a latex composition according to claim 7, further comprising: adding at least one rubber component selected from the group consisting of a styrene-butadiene copolymer, a styrene-butadiene-styrene block copolymer, and a natural rubber, prior to the addition of the nonionic surfactant, in (I).

10. The process for producing a latex composition according to claim 7, wherein the halide ion source is added prior to the addition of the nonionic surfactant.

11. An asphalt composition comprising: asphalt and a latex composition, which comprises 100 parts by mass of the asphalt and 0.5 to 20 parts by mass of the latex composition, wherein the latex composition comprises:
    (i) 100 parts by mass (in terms of a solid content) of an anionic latex comprising a conjugate diene copolymer containing (A) 55 to 99.99% by mass of a conjugate diene unit, (B) 0.01 to 5% by mass of an unsaturated carboxylic acid unit, (C) 0 to 44.99% by mass of an aromatic vinyl compound unit, and (D) 0 to 40% by mass of another unsaturated compound unit copolymerizable therewith,
    (ii) 0.1 to 20 parts by mass of a nonionic surfactant,
    (iii) 0.1 to 10 parts by mass of a cationic surfactant, and
    (iv) 0.1 to 10 parts by mass of a halide ion source.

12. The asphalt composition according to claim 11, wherein the conjugate diene copolymer is a conjugate diene copolymer having a Mooney viscosity ($ML_{1+4}$, 100° C.) of 70 to 170.

13. The asphalt composition according to claim 11, further comprising: at least one selected form the group consisting of a styrene-butadiene copolymer, a styrene-butadiene-styrene block copolymer, and a natural rubber.

14. The asphalt composition according to claim 11, wherein the latex composition comprises 0.1 to 5 parts by mass of a halide ion source (iv).

15. The asphalt composition according to claim 11, wherein the halide ion source (iv) is at least one selected from the group consisting of sodium chloride, potassium chloride, and hydrochloric acid.

16. The asphalt composition according to claim 11, wherein the latex composition further comprises 0.1 to 2 parts by mass of a thickener (v).

17. A cationic asphalt emulsion comprising an asphalt, a latex composition, water, and a cationic surfactant, these components forming an emulsion, wherein the latex composition comprises:
    (i) 100 parts by mass (in terms of a solid content) of an anionic latex containing, as a main component, a conjugate diene copolymer containing (A) 55 to 99.99% by mass of a conjugate diene unit, (B) 0.01 to 5% by mass of an unsaturated carboxylic acid unit, (C) 0 to 44.99% by mass of an aromatic vinyl compound unit, and (D) 0 to 40% by mass of another unsaturated compound unit copolymerizable therewith,
    (ii) 0.1 to 20 parts by mass of a nonionic surfactant,
    (iii) 0.1 to 10 parts by mass of a cationic surfactant, and
    (iv) 0.1 to 10 parts by mass of a halide ion source.

18. The cationic asphalt emulsion according to claim 17, wherein the conjugate diene copolymer is a conjugate diene copolymer having a Mooney viscosity ($ML_{1+4}$, 100° C.) of 70 to 170.

19. The cationic asphalt emulsion according to claim 17, further comprising: at least one selected form the group consisting of a styrene-butadiene copolymer, a styrene-butadiene-styrene block copolymer, and a natural rubber.

20. The cationic asphalt emulsion according to claim 17, comprising: 0.1 to 5 parts by mass of a halide ion source (iv).

21. The cationic asphalt emulsion according to claim 17, wherein the halide ion source (iv) is at least one selected from the group consisting of sodium chloride, potassium chloride, and hydrochloric acid.

22. The cationic asphalt emulsion according to claim 17, wherein the latex composition further comprises 0.1 to 2 parts by mass of a thickener (v).

* * * * *